United States Patent [19]

Kagano et al.

[11] Patent Number: 4,731,687
[45] Date of Patent: Mar. 15, 1988

[54] TAPE CARTRIDGE

[75] Inventors: Shinichi Kagano, Kyoto; Osamu Yamamoto, Takatsuki; Kazuaki Urano, Osaka; Mutsunori Hamaoka, Kyoto, all of Japan

[73] Assignee: Hitachi Maxell, Ltd., Osaka, Japan

[21] Appl. No.: 823,806

[22] Filed: Jan. 29, 1986

[30] Foreign Application Priority Data

Jan. 30, 1985 [JP] Japan .............................. 60-12572[U]

[51] Int. Cl.$^4$ ............................................ G11B 23/04
[52] U.S. Cl. ................................ 360/132; 360/130.32; 360/130.33
[58] Field of Search .............. 360/132, 130.32, 130.33, 360/128-129; 242/197-200

[56] References Cited

U.S. PATENT DOCUMENTS

| | | | |
|---|---|---|---|
| 4,022,402 | 5/1977 | Morimoto | 242/199 |
| 4,191,984 | 3/1980 | Tsukidate | 242/199 X |
| 4,290,567 | 9/1981 | Saito | 242/199 X |
| 4,337,493 | 6/1982 | Kagano | 360/132 |
| 4,452,408 | 6/1984 | Sasaki | 242/197 X |
| 4,506,846 | 3/1985 | Gelardi et al. | 242/199 |
| 4,545,500 | 10/1985 | Yamaguchi et al. | 242/197 X |

Primary Examiner—John H. Wolff
Attorney, Agent, or Firm—Birch, Stewart, Kolasch & Birch

[57] ABSTRACT

A partition wall and a pair of side ribs are disposed in the front portion of a tape cartridge with a gap substantially equal to a thickness of a magnetic shielding plate so as to support the magnetic shielding plate by the partition wall and the side ribs, so that the magnetic shielding plate can be placed in position correctly and easily, thereby assuring reliable positioning of a pad supporting plate.

5 Claims, 8 Drawing Figures

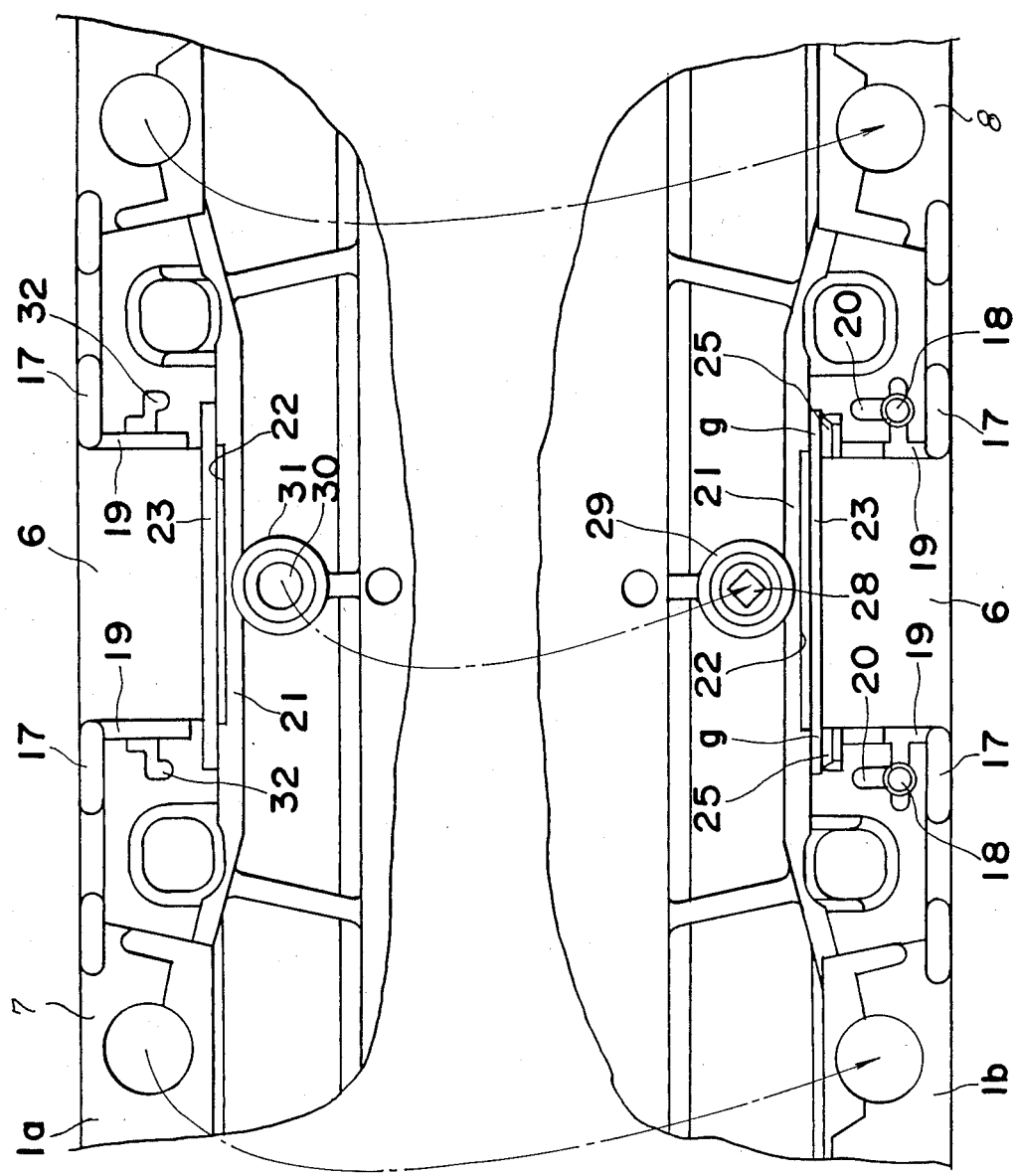

TAPE CARTRIDGE

BACKGROUND OF THE INVENTION

1. Field of the Invention

The present invention relates to a tape cartridge, and more particularly to a tape cartridge having a magnetic shielding member and a spring plate member for supporting a tape contacting pad both provided in the interior of the tape cartridge.

2. Description of the Prior Art

In conventional magnetic recording tape cartridges 1 having a head insertion opening 6, as shown in FIG. 1, a tape pressing pad assembly having a pressing pad 15 attached to a pad support plate 11 made of an elongated and resilient plate is mounted in the front part of the cartridge 1 so as to face the tape insertion opening 6 defined in the front wall of the cartridge for resiliently pressing a recording tape 4 to a magnetic head of a tape player. The tape pressing pad assembly is detachably mounted near the front wall of the tape cartridge in combination with a magnetic shielding plate 10 made of an elongated magnetic plate by merely putting the respective end portions of the plates on suitable base members provided on the bottom half 1a of the tape cartridge so that both plates 10 and 11 are parallel opposed each other.

In this arrangement, it is essential to mount the magnetic shielding plate 10 in position without any play in a vertical direction, a longitudinal direction or front and back directions of the cartridge and lateral direction or left and right directions. The displacement of the magnetic shielding plate 10 in the vertical direction or vertical play can be easily prevented when the top half and the bottom half of the cartridge are assembled together since the top and bottom of the magnetic shielding plate are regulated by the halves. The lateral play of the magnetic shielding plate can be limited by engaging both bent ends 13 of the magnetic shielding plate 10 with a pair of side ribs 25. However, it is a serious problem to prevent the play of the magnetic shielding plate 10 in the longitudinal direction keeping the workability of assembling the magnetic shielding plate in position. Since the pad supporting plate 11 is constrained by the magnetic shielding plate 10, if the magnetic shielding plate is undesirably displaced in the longitudinal direction or if the geometric position of the magnetic shielding plate is not accurate, the position of the tape pressing pad 15 with respect to the tape 4 changes, whereby the pressure of the recording tape 4 against the magnetic head applied by the tape pressing pad changes, resulting in a bad contact of the magnetic head to the recording tape and/or an abnormal tape advance.

Besides the problem mentioned above, there has been proposed to emboss one or more projections 14 in the rear face of the magnetic shielding plate 10 in order to reinforce the plate 10. Only one projection may be formed in the central part of the plate or a plurality of projections may be formed. As shown in FIG. 1. the magnetic shielding plate 10 is assembled in position by inserting the plate 10 in a space defined by the side ribs 25 and a reinforcing rib 21 of the bottom half 1a with the central projection 14 detachably contacted to a projection 29a of a boss 29. Thus, the magnetic shielding plate 10 can be constrained in the longitudinal direction by the three point engagement manner. The arrangement mentioned above facilitates mounting the magnetic shielding plate in position.

However, since the projections 14 must be formed by embossing, there may occur errors in the size of the projection 14 and/or the flatness of the surface of the projection 14, thereby resulting in an error of position of the end of the bent portion 13 of the magnetic shielding plate 10. As a result, there tends to occur difference of the pressure applied to the recording tape by the tape pressing pad assembly.

SUMMARY OF THE INVENTION

An essential object of the present invention is to provide a tape cartridge in which a magnetic shielding plate can be easily mounted in a correct position with negligible error.

According to the present invention there is provided a tape cartridge comprising:
- a case body formed of a top half and a bottom half combined together and having a head insertion opening on the front portion of the case body;
- a magnetic tape wound around a pair of hubs and contained in the case body;
- a magnetic shielding plate provided between the opening and the wound tape in the case body;
- a partition wall formed between the shielding plate and the tape for excluding the wound tape from the shielding plate; and
- a pair of side ribs formed in front of the partition wall, each having a contact surface portion contactable with the shielding plate, the contact portions of the side ribs extending substantially the length of said partition wall along both side ends of the plate, the partition wall having a pair of contact surface portions with a recess therebetween, and a gap between the surfaces of the contact surface portions of the partition wall and the contact surface portions of the side ribs substantially equal to a thickness of the shielding plate, whereby the shielding plate is held within the gap by contacting the respective contact surface portions.

In the arrangement mentioned above, the magnetic shielding plate can be supported by the partition wall and the side ribs, thereby making it possible to mount the magnetic shielding plate in position with a high degree of accuracy.

BRIEF EXPLANATION OF THE DRAWINGS

FIG. 7 is a partial plan view showing an essential portion of a top half of the recording tape cartridge shown in FIG. 3, and FIG. 8 is a partial plan view showing an essential portion of a bottom half of the recording tape cartridge shown in FIG. 3.

DETAILED DESCRIPTION OF A PREFERRED EMBODIMENT

Figure 1:
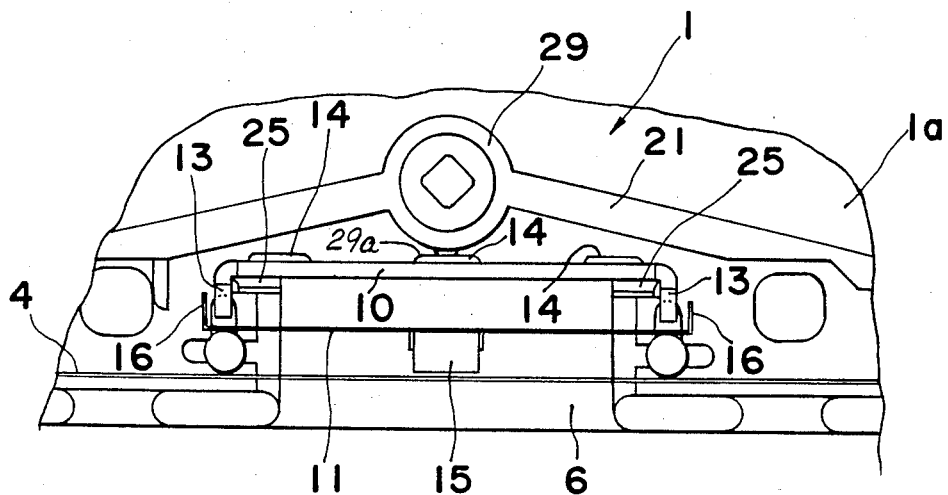
FIG. 1 is an enlarged partial top plan view showing a conventional tape pressing pad assembly.

Before the description proceeds, it is noted that like parts are designated by like reference numerals throughout the attached drawings.

Figure 2:
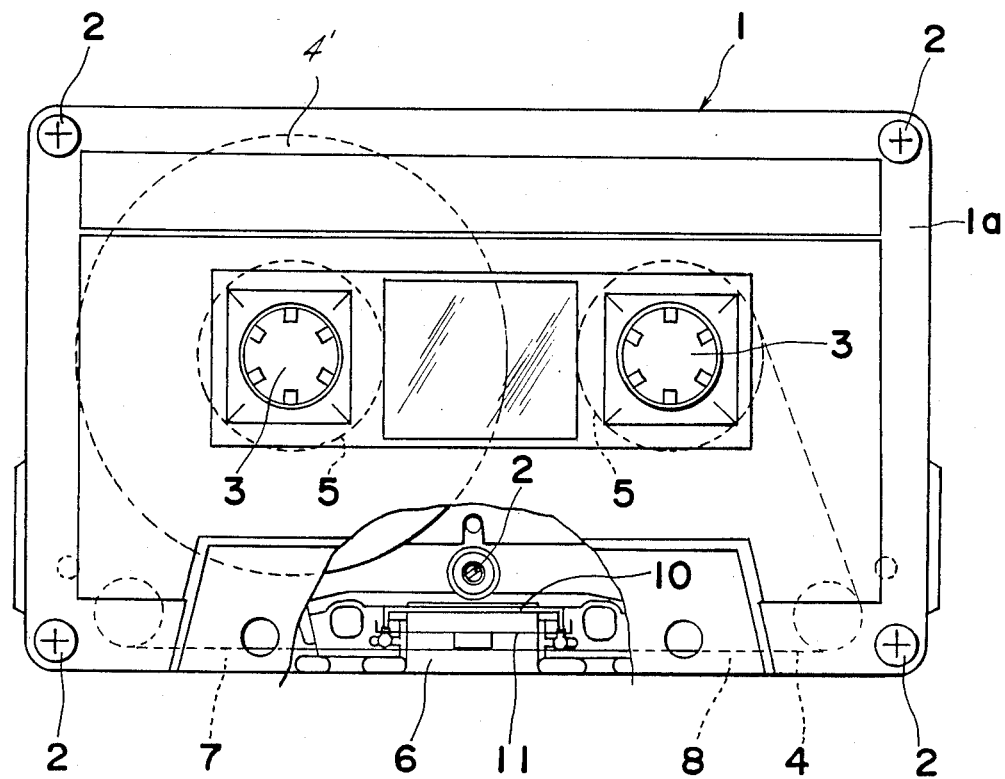
FIG. 2 is a top plan view of one preferred embodiment of a recording tape cartridge according to the present invention with a top half partially broken.

Referring to FIG. 2, a top half 1a and a bottom half 1b both made of plastic resin materials are assembled together to form the case body 1 by a butting manner. In the embodiment shown, the top half 1a and bottom half 1b are connected by tapping screws on each corner and the central portion.

A pair of drive shaft insertion holes 3 is defined in the left and right half portions of the case body 1 and a pair of tape hubs 5 is rotatably mounted in the left and right half portions with their hubs facing to the respective drive shaft insertion holes 3. The recording tape 4 wound around one of the tape hubs 5 is rewound and taken by another tape hub passing a predetermined tape path along the head insertion hole 6.

In FIG. 2, and FIGS. 7 and 8 reference numeral 7 denotes a erasing head insertion opening and 8 denotes a pinch roller insertion opening, each defined on the front wall of the case body 1.

Figure 3:
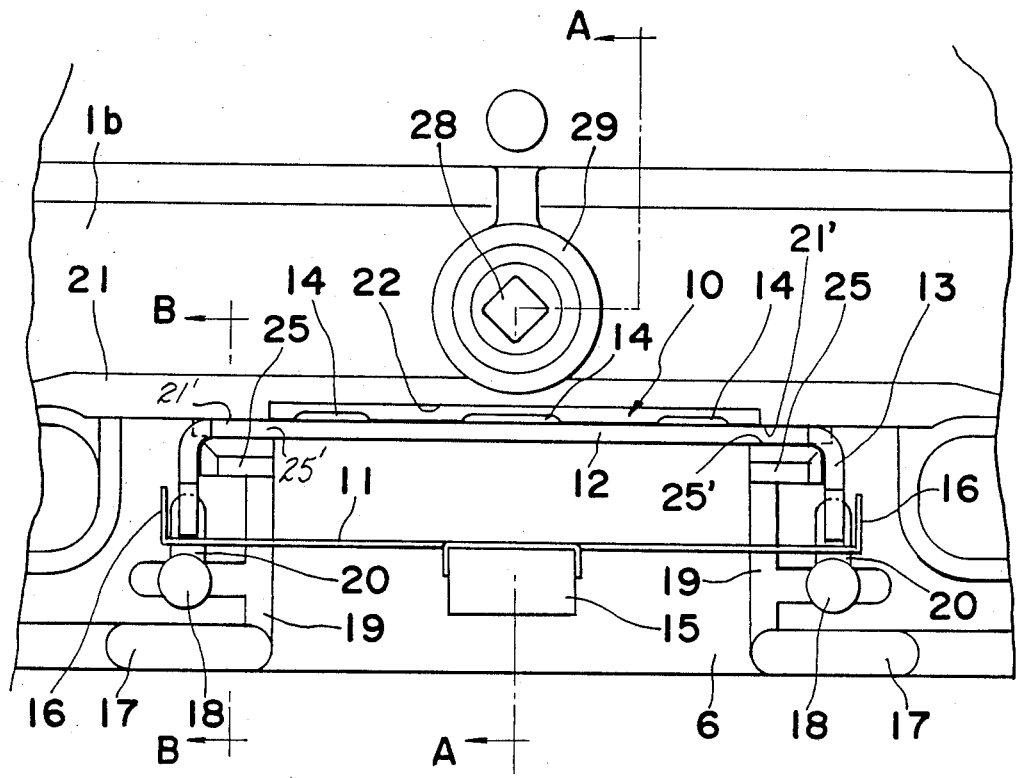
FIG. 3 is an enlarged partial top plan view of the embodiment shown in FIG. 2.
Figure 5:
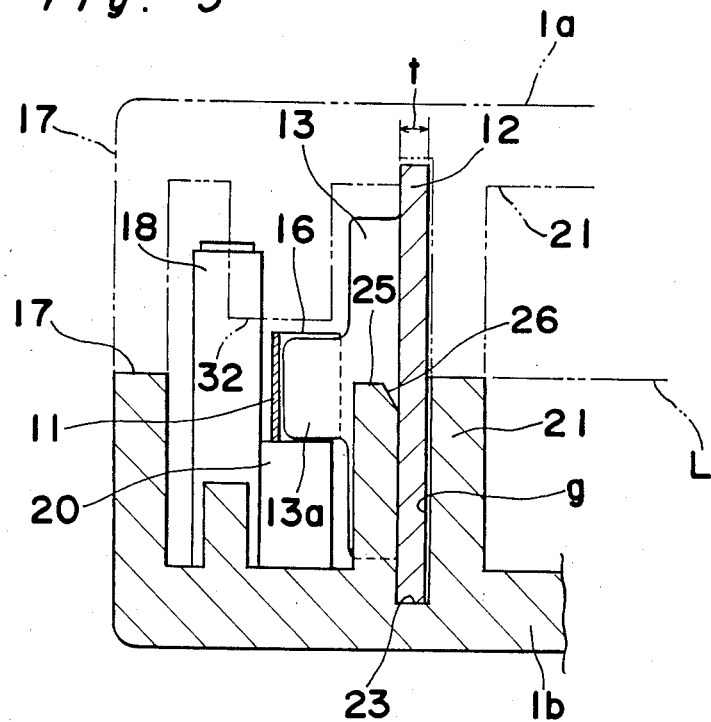
FIG. 5 is a cross sectional view taken along the lines B—B in FIG. 3.
Figure 6:
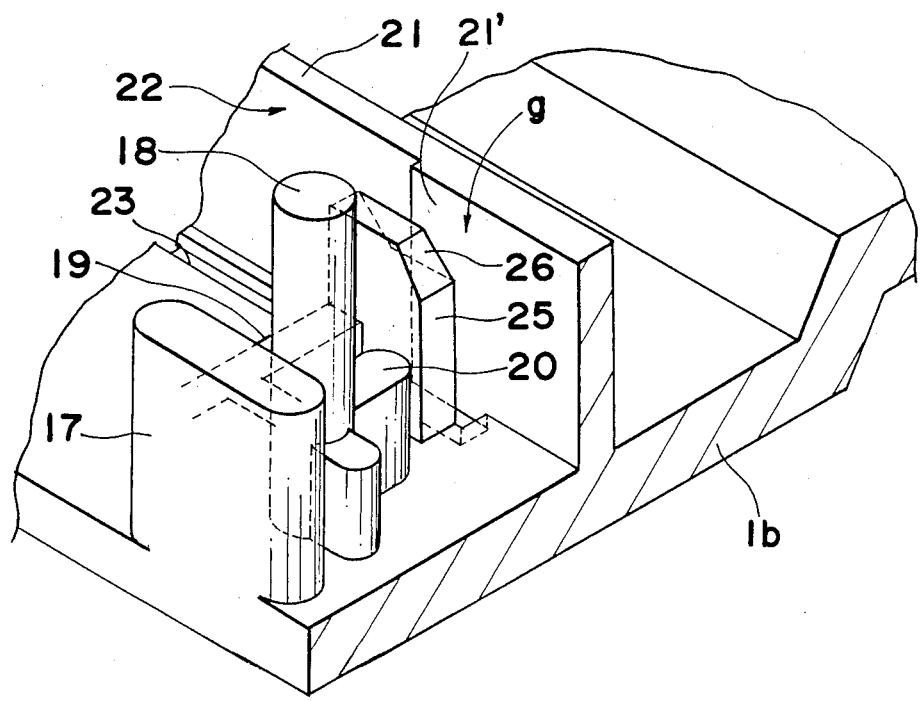
FIG. 6 is a perspective view showing a side rib and a partition wall used in the arrangement shown in FIG. 2.

Referring to FIG. 3, the magnetic shielding plate 10 is formed in a generally U character shape in top plan view by a straight main plate 12 and bent end plates 13 bent at both ends of the main plate 12. The magnetic shielding plate 10 is placed in position causing the bent end plates 13 to be directed toward the front wall 17 of the case body 1. A plurality of projections 14 are protrudingly formed in the rear surface of the main plate 12 of the magnetic shielding plate 10 in the rear direction which is opposite to the direction of the bent end plates 13. In the preferred embodiment, five projections 14, one in the central portion and a pair of upper and lower projections 14 on both the left hand and the right hand of the main plate 12 are formed. Free ends 13a of both of the bent end plates 13 are respectively narrowed, as shown in FIG. 5, by cutting the top portion and bottom portion.

The pad supporting plate 11 is made of nickel silver plate or phosphor bronze plate and the pad 15 made of felt in cubic shape is fed at the center of the plate 11. Both ends of the pad supporting plate 11 are bent to form bent ends 16 which are directed backward in the case body 1 when the pad supporting plate 11 is placed in position, as shown in FIG. 3.

The front walls 17 are formed by connecting a wall member projected from the top half 1a and another wall member projected from the bottom half 1b in a known manner. A pair of tape guide pins 18 is integrally projected from the bottom wall of the bottom half 1b near the front wall 17 respectively, whereby the space defined by each pair of the front wall 17 and the tape guide pin 18 forms the tape path in the front portion of the case body 1.

The height of both tape guide pins 18 are so defined that when the top half 1a and bottom half 1b are assembled, the top surfaces of the tape guide pins 18 contact with the inner surface of the top wall of the top half 1a. Each of the halves 1a and 1b is provided with a pair of ribs 19 extending from the front walls 18 in the longitudinal direction for regulating the height of the recording tape 4 by slidably supporting the top and bottom edges of the recording tape. Also, ribs 20 are provided on the bottom wall of the bottom half 1b for supporting the pad supporting plate 11. The ribs 20 is slightly higher than the ribs 19.

Inside the head insertion hole 6, partition walls 21 are vertically projected on the same position of both of the top walls 1a and bottom wall 1b so that when the top half 1a and bottom half 1b are assembled, both walls 21 are connected together to form a single partition wall. The partition walls 21 are formed so as to extend straight in the lateral direction between a pair of side ribs 25 and the boss 29 for receiving the connecting screw. The partition walls 21 are provided for partitioning the magnetic shielding plate 10 and the tape 4 wound on the hubs 5. A recess 22 extending in the lateral direction is defined in the front surface of each of the partition walls 21 corresponding to the head insertion hole 6. Receiving slots 23 are recessed on the inner surface of the top wall of the top half 1a and the bottom wall 1b along the front root portion of each of the partition walls 21.

Figure 4:
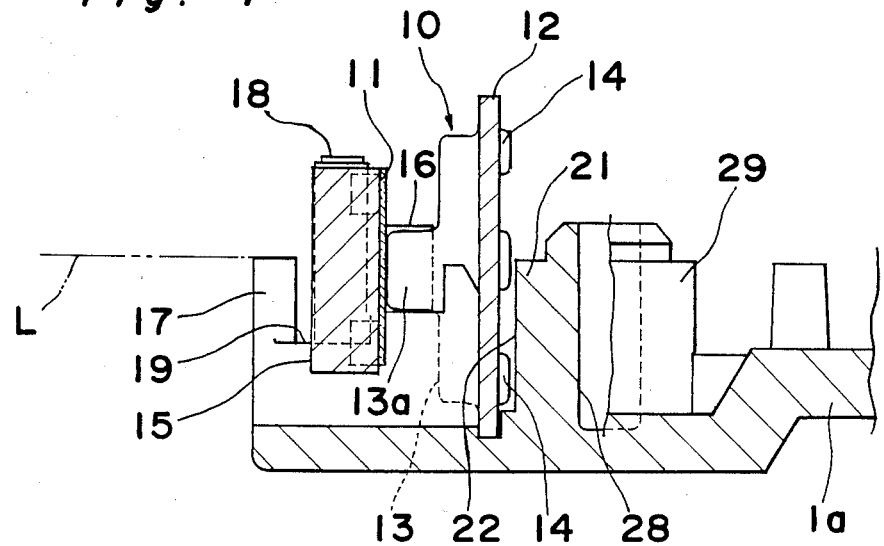
FIG. 4 is a cross sectional view taken along the lines A—A in FIG. 3.

The pair of side ribs 25 are formed spaced by the receiving slot 23 so as to parallel face a part of the front surface of the partition wall 21 with a height of the halves 1a or 1b the level of which is shown by the chain line L in FIG. 4. The side ribs 25 are formed in such a manner that at least a part of each of the ribs 25 namely, a contact surface portion 25' faces a part of the front surface of the partition wall 21, namely a contact surface portion 21' just outside the recess 22 and the gap g between the front surface of the contacting surface portion 21' of the partition wall 21 and the surface of the contact surface portion 25' of the side rib 25 is equal to or slightly larger than the thickness t of the main plate 12 of the magnetic shielding plate 10. The root portion of each of the side ribs 25 is connected with the rib 19 and the top end of the side rib 25 is slanted at 26.

The way of assembling the magnetic shielding plate 10 and pad supporting plate 11 to the case body 1 will be described hereinafter.

The magnetic shielding plate 10 is assembled in the bottom half 1b by inserting the main plate 12 in the space between the partition wall 21 and the side ribs 25 guided by the slanted surfaces 26 of the side ribs 25. Since the side ribs 25 are substantially the same height of the bottom half 1b, the magnetic shielding plate 10 is easily dropped in position compared to the conventional arrangement in which the side ribs are lower than the height of the bottom half 1b. This feature facilitates adoption of the automatic mounting machine. In this case, the projections 14 of the magnetic shielding plate 10 can be received in the recess 22 without engaging with the front surface of the partition wall 21. Then the bottom edge of the magnetic shielding plate 10 is received in the slot 23 and both left hand and right hand portions of the main plate 12 are placed and constrained between the partition wall 21 and the side ribs 25, so that the magnetic shielding plate 10 is readily positioned without falling down and sliding in the longitudinal direction i.e., front and back directions of the cartridge. In the embodiment, the thickness of the main plate 12 is about 0.6 mm and the gap g is not greater 0.1 mm than the thickness t, and the main plate 12 can be fitted in position without any play. Also, the side ribs 25 engage with both inner bent corners of the bent portions 13 to prevent the magnetic shielding plate 10 from being displaced in the lateral direction. The free end portions 13a of the magnetic shielding plate 10 are placed above the ribs 20.

Subsequently, the pad supporting plate 11 is mounted in such a manner that the bent end portions 13 are put in the space between the tape guide pins 18 and the front ends of the bent portions of the magnetic shielding plate 10 from above and the pad supporting plate 11 is put on the ribs 20. Under this state, the supporting plate 11 is constrained from movement in the front and back directions by the free ends of the bent portions 16 of the magnetic shielding plate 10 and movement of the pad supporting plate 11 in the lateral direction is also limited by the engagement of the bent portions 16 and the bent portions 13a of the magnetic shielding plate.

After assembling of the tape hubs on which the recording tape 4 is wound, as indicated by 4' in FIG. 2, and other components in the bottom half 1b, the top half 1a is assembled on the bottom half 1b and they are connected by tapping screws in the known manner, the bosses 31 formed on the top half 1a being engaged in the bosses 29 having the screw hole 29 of the bottom half 1b, then both halves are fastened by screws. Under the assembled condition, the top edge portion of the main plate 12 of the magnetic shielding plate can be fitted in the slot 23 of the top half 1a so that the position of the magnetic shielding plate in the vertical direction is constrained. Also, as shown in FIGS. 5 and 7, the ribs 32 on the top half 1a are situated above the ribs 20 of the bottom half 1b, so that both ribs 32 and 20 serve to limit the movement of the pad supporting plate 11 in the vertical direction.

In the embodiment shown in the drawings, the magnetic shielding plate 10 is prevented from falling only by the side ribs 25 on the bottom half 1b, it may be possible to provide further side ribs 25 on the top half 1a for preventing the magnetic shielding plate 10 from being fallen.

According to the present invention, the main plate 12, except for the projections 14 of the magnetic shielding plate 10, is adapted to engage with the front surface of the partition wall 21 and the side ribs 25 for positioning the magnetic shielding plate 10, so that the position of the magnetic shielding plate 10 is not affected by the accuracy of the projections 14. Since the thickness t of the main plate 12 is made with a high accuracy, the front ends of the bent portions 13a of the magnetic shielding plate 10 can be easily positioned with a high degree of accuracy, thus the pad supporting plate 11 and the pad itself can be positioned at a desired position with a high degree of accuracy without erros. Also, the magnetic shielding plate and pad supporting plate 11 can be easily mounted in the case body. Furthermore since the magnetic shielding plate can be positioned correctly, without play, the pad supporting plate can be prevented from falling. Also, occurrence of noise due to vibration of the magnetic shielding plate can be suppressed even if the cartridge is vibrated.

Although the partition wall 21 is made as a straight wall in the embodiment shown, the partition wall may be slanted as used in the prior art and the projections 14 may be received in the space defined by the slanted partition wall. However, it is essential in the present invention to engage the main plate of the magnetic shielding plate 11, except for the projections 14, with the partition wall 21.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge comprising:
    a case body including a top half and a bottom half combined together forming a head insertion opening on a front portion of the case body;
    a magnetic tape wound around a pair of tape hubs and contained in the case body;
    a magnetic shielding plate of a definite thickness provided between said opening and the wound tape in the case body;
    a partition wall provided between said shielding plate and said wound tape for separating said wound tape from said shielding plate; and
    a pair of side ribs provided in front of said partition wall between said opening and said magnetic shielding plate forming a gap with respect to said partition wall, each side rib having a surface portion which contacts said shielding plate, said contact portions of said side ribs extending substantially the length of said partition wall along respective side ends of side plate;
    said partition wall having a pair of lateral contact surface portions with a recess therebetween, said gap between said partition wall and said side ribs being substantially equal to said thickness of said shielding plate, thereby holding said shielding plate within said gap by said respective contact surface portions.

2. The tap cartridge according to claim 1, wherein said magnetic shielding plate comprises bent portions at said end portions such that said bent portions engage with said side ribs for preventing lateral movement of said magnetic shielding plate.

3. The tape cartridge according to claim 1, wherein a top corner portion of each of said side ribs is slanted.

4. The tape cartridge according to claim 1, wherein said side ribs are formed on said bottom half.

5. The tape cartridge according to claim 1, wherein each of said side ribs has a height substantially equal to the thickness of said bottom half.

* * * * *